United States Patent [19]

Finkelmann et al.

[11] Patent Number: 5,385,690

[45] Date of Patent: Jan. 31, 1995

[54] LIQUID-CRYSTALLINE ELASTOMERS OR THERMOSET MATERIALS HAVING A FIXED ANISOTHROPIC NETWORK STRUCTURE

[75] Inventors: Heino Finkelmann, c/o E. Merck Frankfurter Strasse 250, D-6100 Darmstadt; Jürgen Küpfer, Freiburg, both of Germany

[73] Assignee: Heino Finkelmann, Denzlingen, Germany

[21] Appl. No.: 930,527

[22] PCT Filed: Jul. 13, 1992

[86] PCT No.: PCT/EP92/01591

§ 371 Date: Sep. 30, 1992

§ 102(e) Date: Sep. 30, 1992

[87] PCT Pub. No.: WO93/03114

PCT Pub. Date: Feb. 18, 1993

[30] Foreign Application Priority Data

Jul. 26, 1991 [DE] Germany .............................. 4124859

[51] Int. Cl.$^6$ .......................... C09K 19/52; G02F 1/13
[52] U.S. Cl. ................................. 252/299.01; 428/1; 359/73; 359/75; 359/76; 359/96
[58] Field of Search ...................... 252/299.01; 428/1; 359/73, 75, 76, 96

[56] References Cited

U.S. PATENT DOCUMENTS

| | | | |
|---|---|---|---|
| 5,039,208 | 8/1991 | Ohmishi et al. | 252/299.01 |
| 5,098,975 | 3/1992 | Omelis et al. | 252/299.01 |
| 5,164,111 | 11/1992 | Dorsch et al. | 252/299.01 |
| 5,308,535 | 5/1994 | Schenble et al. | 252/299.01 |

FOREIGN PATENT DOCUMENTS 3925382 1/1991 Germany .

OTHER PUBLICATIONS

"Liquid Crystal Side Chem polymers", Finkelmann Liquid Crystals Polymers II/III pp. 155–159. Editor. Gordon, 1984.

*Primary Examiner*—Shean Wu
*Attorney, Agent, or Firm*—Millen, White, Zelano & Branigan

[57] ABSTRACT

The invention relates to a process for the preparation of liquid-crystalline elastomers or thermoset materials having a fixed, anisotropic network structure, characterized in that liquid-crystalline elastomers containing reactive radicals having unreacted functional groups are aligned in a first step by the action of a mechanical stress, and this alignment is fixed in a subsequent second step by linking at least some of the reactive radicals to polymer chains, and to liquid-crystalline elastomers or thermoset materials having a fixed, anisotropic network structure prepared by these processes.

19 Claims, 8 Drawing Sheets

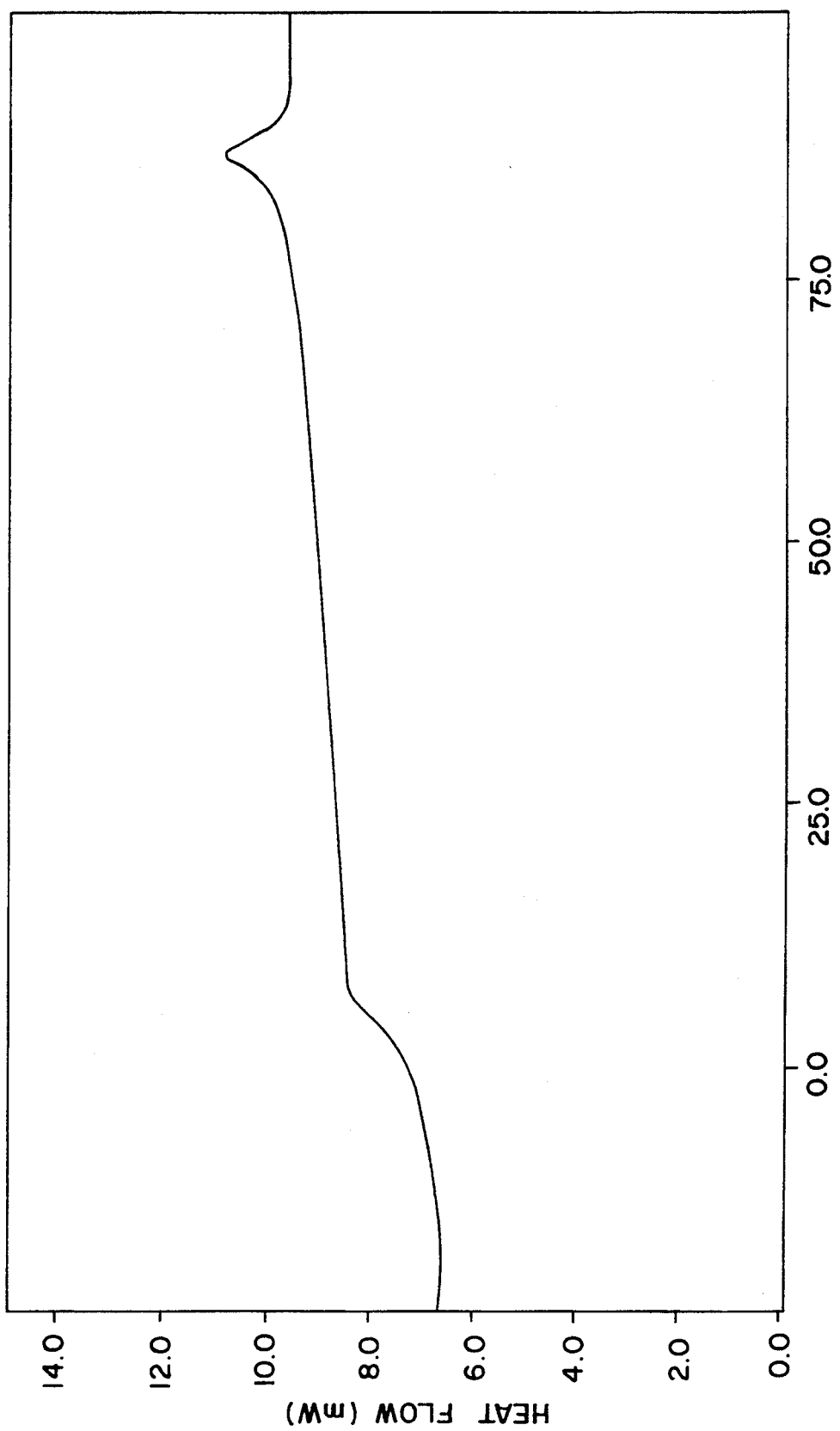

LIQUID-CRYSTALLINE ELASTOMERS OR THERMOSET MATERIALS HAVING A FIXED ANISOTHROPIC NETWORK STRUCTURE

SUMMARY OF THE INVENTION

The invention relates to liquid-crystalline elastomers or thermoset materials having a fixed, anisotropic network structure, and to processes for their preparation.

Liquid-crystalline elastomers are polymer networks which can be prepared, for example, by linking the polymer chains of liquid-crystalline side-chain polymers to one another by means of bifunctional molecules. In these materials, although the chain segments and the mesogenic groups are mobile above the glass transition temperature, the material as such retains its shape stability as a consequence of the crosslinking. In the mechanically unloaded state, the alignment of the nematic director of the mesogenic groups is macroscopically nonuniform, and the elastomer appears opaque. However, if a sample of an elastomeric material, such as, for example, an elastomer film, is uniaxially stretched above the glass transition temperature, the directors of the mesogenic groups align themselves parallel to the direction of the tensile stress. The sample becomes transparent and corresponds in its optical properties to a monocrystal of the same dimension. If the load on the elastomer sample is removed, it returns to the unordered, opaque state due to its elasticity.

Macroscopic organic monocrystals of this type are of extremely great interest for applications, for example, in integrated optics and can furthermore be used, for example, for achieving Kerr cells, Pockels cells, frequency doublers or dichroic filters.

In order to preserve the monocrystal state, it has been proposed, for example, to rapidly cool the aligned elastomer to below the glass transition temperature with an applied mechanical stress (J. Schätzle, H. Finkelmann, Mol. Cryst. Liq. Cryst., 142 (1987) 85). However, this process has the disadvantage that the service temperature range of these "frozen" monocrystals is limited at the top by the glass transition temperature.

JP 02-074924 has proposed generating films having a monodomain structure by aligning liquid-crystalline polymers having a molecular weight of between 1,000 and 10,000 on a substrate plate provided with an alignment layer, and crosslinking the aligned polymers in an applied magnetic field. JP 02-047628 proposes electrostatically aligning and crosslinking ferroelectric liquid-crystalline polymers. Another variant (JP 01-297431) proposes carrying out the alignment of the film on a water surface, and subsequently carrying out the crosslinking thereon.

It is common to all these processes that the degree of order of the films which can be achieved does not satisfy all demands and that the films have too many defect structures. Furthermore, only relatively thin films can be obtained by the conventional processes.

An object of the present invention comprises providing 3-dimensionally crosslinked liquid-crystalline polymers having a fixed, anisotropic network structure which do not have the disadvantages observed in the case of conventional materials or only do so to a lesser extent. A further object of the present invention was to indicate a process for the preparation of these improved organic monocrystals. Further objects of the present invention are revealed to a person skilled in the art by the detailed description of the invention which follows.

It has been found that these objects can be achieved by the novel process and by the provision of the novel elastomers or thermoset materials having a fixed, anisotropic network structure.

BRIEF DESCRIPTION OF THE DRAWINGS

FIGS. 3a and 3b illustrate, respectively, DSC diagrams for the unaligned elastomer of Example 1a and the aligned elastomer monocrystal of Example 1c;

DESCRIPTION OF THE PREFERRED EMBODIMENTS

The invention thus relates to a process for the preparation of liquid-crystalline elastomers or thermoset materials having a fixed, anisotropic network structure, characterized in that elastomers containing reactive radicals having at least one unreacted functional group are uniaxially or biaxially aligned in a first step by the action of a mechanical stress, and this alignment is fixed in a subsequent second step by linking at least some of the reactive radicals to polymer chains.

The invention relates to further liquid-crystalline elastomers or thermoset materials having a fixed, anisotropic network structure which are obtainable by this process, and to liquid-crystalline elastomers of the formula I.

The process according to the invention comprises two successive reactions:

Step 1: A liquid-crystalline elastomer containing reactive radicals having unreacted functional groups is uniaxially or biaxially stretched by the action of a mechanical stress.

Step 2: The elastomer alignment produced by applying a mechanical "field" is "chemically" frozen by linking at least some of the reactive radicals to polymer chains.

The liquid-crystalline elastomers aligned in step 1 are preferably selected from the group consisting of the elastomers of the formula I

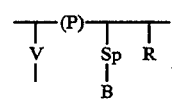

in which
(P) is a polymer chain unit,
Sp is a bivalent spacer group,

B is an organic rod-like radical containing at least two six-membered groups, a disk-like radical or a board-like radical, V is a group which crosslinks polymer chains, and R is a reactive radical containing at least one unreacted functional group.

The formula I describes the preferred elastomers only in a highly schematic manner. Thus, for example, it is not necessary for each main-chain unit to carry a mesogenic unit. Furthermore, formula I is also intended to include copolymers containing different polymer chain units. In addition, the number of groups V, R and Sp-B does not generally agree. In spite of these defects, the formula I appears to be suitable for a schematic, illustrative representation of elastomers of the formula I and is therefore used.

The liquid-crystalline elastomers of the formula I are prepared analogously to polymerization processes which are known per se and are described in the literature (for example in the standard works such as Ocian, Principles of Polymerization, McGraw Hill, New York), and under reaction conditions which are known and suitable for the reactions. Use may also be made here of variants which are known per se, but are not described here in greater detail.

Figure 7:
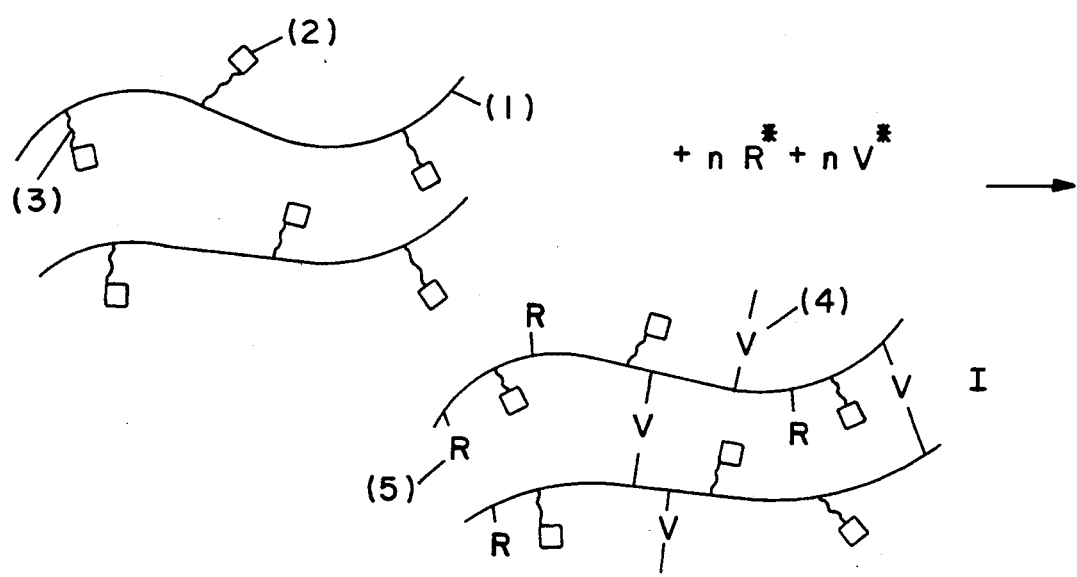
FIG. 7 illustrates the obtainment of liquid-crystalline elastomers of formula I by polymer-analogous addition reactions of side-chain polymers with cross-linking molecules V* and reactive compounds R*.

Liquid-crystalline elastomers of the formula I can be obtained, for example, by polymer-analogous addition reactions of side-chain polymers with crosslinking molecules V* and reactive compounds of the type R*, as shown schematically in FIG. 7.

In this schematic representation, (2) denotes the mesogenic side groups, which are bonded terminally, as shown here, or alternatively laterally to a polymer backbone (1) via flexible spacers (3). (4) represents a crosslinking unit between two adjacent polymer chains. In contrast to conventional elastomers, the elastomers of the formula I contain additional reactive radicals R (5).

The index * indicates that the crosslinking molecules and the reactive compounds generally have 2 or more reactive sites, at least one of the reactive sites in there active compounds being characterized by significantly lower reactivity than the other reactive site(s).

Preference is furthermore given to processes for the preparation of elastomers of formula I in which the groups Sp-B and R and, if present, V are attached to crosslinked or uncrosslinked polymer chains —P— (for example by grafting reactions, cf. DE 38 17 088).

Elastomers of the formula I can furthermore be prepared by polymerization of monomers and/or oligomers in the presence of reactive compounds R* and optionally crosslinking agents V*. If the monomers and/or oligomers at least predominantly have only 2 linking sites, the presence of crosslinking agents V* is necessary, at least one of the reactive sites of the reactive compound R* not yet reacting under the conditions under which the crosslinking sites of the monomers and/or oligomers and the reactive sites of the crosslinking agents are reacted. If the monomers and/or oligomers contain more than 2 linking sites in the molecule, the crosslinking agent can optionally also be omitted. Monomers and oligomers containing more than 2 linking sites in the molecule are frequently preferred; mention may be made here by way of example of monomers and/or oligomers containing 2 C—C double bonds, but also monomers or oligomers containing one C—C double bond and one or more hydroxyl groups and/or carbonyl groups and/or other groups which are capable of polymerization can preferably be used.

Synthesis of the elastomer from low-molecular weight compounds frequently has the advantage, in particular, that important properties of the elastomer, such as, for example, its elasticity or birefringence or else other properties can be modified and adjusted in a specific manner within certain limits by varying the synthesis parameters, such as, for example, the polymerization temperature, the concentration of the polymerization initiator, the relative weight ratio of comonomers or cooligomers, etc.

The low-molecular weight compounds are preferably liquid-crystalline and/or preferably carry mesogenic groups B already bonded via spacer groups Sp. As already mentioned, however, subsequent attachment of these groups to the polymer structure is also possible.

The preparation of liquid-crystalline elastomers of the formula I is preferably carried out analogously to processes as described in DE 38 17 088, DE 38 11 334 and DE 36 21 581, with reactive compounds R* additionally being co-reacted.

Liquid-crystalline elastomers can have various liquid-crystalline phases (nematic, smectic, diskotic, cholesteric). Elastomers having nematic, smectic and/or cholesteric phases are preferred. Of the elastomers which have nematic and/or smectic phases, particular preference is given to those in which the director is aligned perpendicular to the deformation axis on elongation of the material and parallel to the deformation axis on compression.

Suitable polymeric backbones —(—P—)— are in principle all polymers whose chains have a certain flexibility. These may be linear, branched or cyclic polymer chains. The degree of polymerization is normally at least 10; however, oligomers containing from 3 to 15, in particular containing from 4 to 7, monomer units are also suitable.

Preference is given to polymers containing C—C main chains, in particular polyacrylates, polymethacrylates, poly-$\alpha$-haloacrylates, poly-$\alpha$-cyanoacrylates, polyacrylamides, polyacrylonitriles or polymethylene malonates. Preference is furthermore also given to polymers containing hetero atoms in the main chain, for example polyethers, polyesters, polyamides, polyimides, polyphosphazenes or polyurethanes or, in particular, polysiloxanes.

Suitable spacers are, in particular, linear or branched alkylene groups having 1–20 carbon atoms in which, in addition, one or more non-adjacent $CH_2$ groups may be replaced by —O—, —S—, —CO—, —0—CO—, —S—CO—, —0—COO—, —CO—S—, —CO—O—, —CH-halogen, —CHCN—, —CH=CH— and —C≡C—.

Examples of suitable spacers are the following groups: ethylene, propylene, butylene, pentylene, hexylene, octylene, decylene, undecylene, dodecylene, octadecylene, ethyleneoxyethylene, methyleneoxybutylene, ethylenethioethylene, ethylene-N-methyliminoethylene or 1-methylalkylene.

B is preferably a rod-like or board-like mesogenic group.

The rod-like mesogenic groups used are generally low-molecular weight liquid-crystalline radicals which are bonded laterally or terminally to the polymer chain via sufficiently flexible spacers. In the case of terminal linking, which is generally preferred, the nematic radicals are able to rotate about the molecular long axis and therefore have cylindrical symmetry.

If, by contrast, the rotation of the nematic radicals is virtually prevented by a rigid spacer group, board-like mesogenic groups are obtained. However, other radicals having a board-like geometry can also be used.

In liquid-crystalline polymers containing board-like mesogenic groups, it is possible for not only the molecular long axes to be arranged parallel, but, in addition, long-range alignment order with respect to the transverse axes is also possible. Such liquid-crystalline polymers are known as biaxially nematic.

B is particularly preferably a radical of the formula III $$R^1-(A^1-Z^1)_n-A^1-Z^2-A^3- \qquad \text{III}$$

in which $R^1$ is F, CN or an alkyl radical having 1–15 carbon atoms which is unsubstituted or substituted by at least one halogen atom and in which one or more non-adjacent $CH_2$ groups may be replaced by O and/or S atoms and/or by —CO—, —O—CO—, —CO—O, —O—CO—O—, —S—CO— and/or —CO—S— and/or —CH=CH— groups, $Z^1$ and $Z^2$ are each, independently of one another, —CO—O—, —O—CO—, —CH$_2$CH$_2$—, —CH$_2$—O—, —OCH$_2$—, —C≡C— or a single bond, $A^1$, $A^2$ and $A^3$ are each, independently of one another, a 1,4-phenylene group in which, in addition, one or more CH groups may be replaced by N, a 1,4-cyclohexylene group in which, in addition, one or two non-adjacent $CH_2$ groups may be replaced by O and/or S, a 1,4-cyclohexenylene group, a 1,4-bicyclo(2,2,2)octylene group, a piperidine-1,4-diyl group, a naphthalene-2,6-diyl group, a decahydronaphthalene-2,6-diyl group, a 1,2,3,4-tetrahydronaphthalene-2,6-diyl group, all these groups being unsubstituted or monosubstituted or polysubstituted by halogen, nitril and/or $C_1$–$C_4$-alkyl, and n is 0, 1, 2 or 3.

The formula III covers bicyclic, tricyclic, tetracyclic and pentacyclic radicals of the sub-formulae III1–III4:

$$R^1-A^2-Z^2-A^3 \qquad \text{III1}$$

$$R^1-A^1-Z^1-A^2-Z^2-A^3 \qquad \text{III2}$$

$$R^1-A^1-Z^1-A^1-Z^1-A^2-Z^2-A^3 \qquad \text{III3}$$

$$R^1-A^1-Z^1-A^1-Z^1-A^1-Z^1-A^2-Z^2-A^3 \qquad \text{III4}$$

In the mesogenic radicals of the formula III, R' is preferably an alkyl or alkenyl radical which is unsubstituted or substituted by at least one halogen atom in which one or two non-adjacent $CH_2$ groups in these radicals may be replaced by O atoms and/or by —O—CO—, —CO—O— and/or —O—CO—O— groups.

Halogen is preferably F or Cl.

Furthermore, the mesogenic radicals of the formula III in which $R^1$ is CN, F or Cl are preferred.

If $R^1$ is an alkyl radical or alkoxy radical, this may be straight-chain or branched. It is preferably straight-chain, has 2, 3, 4, 5, 6, 7 or 8 carbon atoms and accordingly is preferably ethyl, propyl, butyl, pentyl, hexyl, heptyl, octyl, ethoxy, propoxy, butoxy, pentoxy, hexoxy, heptoxy or octoxy, furthermore methyl, nonyl, decyl, undecyl, dodecyl, tridecyl, tetradecyl, pentadecyl, methoxy, nonoxy, decoxy, undecoxy, dodecoxy, tridecoxy or tetradecoxy.

Oxaalkyl is preferably straight-chain 2-oxapropyl (=methoxymethyl), 2- (=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, or 2-, 3-, 4-, 5-, 6-, 7-, 8- or 9-oxadecyl.

If $R^1$ is an alkenyl radical, this may be straight-chain or branched. It is preferably straight-chain and has 2 to 10 carbon atoms. Accordingly, it is in particular vinyl, prop-1-, 2-, or 3-enylpent-4-enyl, hex-1-, 2-, 3-, 4- or hex-5-enyl, hept-1-, 2-, 3-, 4-, 5- or hept-6-enyl, oct-1-, 2-, 3-, 4-, 5-, 6- or oct-7-enyl, non-1-, 2-, 3-, 4-, 5-, 6- 7- or non-8-enyl, dec-1-, 2-, 3-, 4-, 5-, 6-, 7-, 8- or dec-9-enyl.

Mesogenic radicals of the formula III containing a branched wing group $R^1$ may occasionally be of importance as comonomers, for example due to a reduction in the tendency towards crystallization. Branched groups of this type generally contain not more than one chain branch. Preferred branched radicals $R^1$ are isopropyl, 2-butyl (=1-methylpropyl), isobutyl (=2-methylpropyl), 2-methylbutyl, isopentyl (=3-methylbutyl), 2-methylpentyl, 3-methylpentyl, 2-ethylhexyl, 2-propylpentyl, 2-octyl, isopropoxy, 2-methylpropoxy, 2-methylbutoxy, 3-methylbutoxy, 2-methylpentoxy, 3-methylpentoxy, 2-ethylhexoxy, 1-methylhexoxy, 2-octyloxy, 2-oxa-3-methylbutyl, 3-oxa-4-methylpentyl, 4-methylhexyl, 2-nonyl, 2-decyl, 2-dodecyl, 6-methyloctoxy, 6-methyloctanoyloxy, 5-methylheptyloxycarbonyl, 2-methylbutyryloxy, 3-methylvaleryloxy, 4-methylhexanoyloxy, 2-chloropropionyloxy, 2-chloro-3-methylbutyryloxy, 2-chloro-4-methylvaleryloxy, 2-chloro-3-methylvaleryloxy, 2-methyl-3-oxapentyl and 2-methyl-3-oxahexyl.

Bicyclic, tricyclic and tetracyclic mesogenic radicals are preferred. Furthermore preferred are radicals which contain not more than one 1,4-bicyclo(2,2,2)octylene group, piperidine-1,4-diyl group or 1,2,3,4-tetrahydronaphthalene-2,6-diyl group.

In pentacyclic mesogenic radicals, $Z^2$ is preferably a single bond or —CH$_2$CH$_2$—.

Of the mesogenic radicals of formula III which contain a heterocyclic group, those containing a pyridine-2,5-diyl group, pyridazine-2,5-diyl group, pyrimidine-2,5-diyl group or piperidine-1,4-diyl group are particularly preferred.

A relatively small group of particularly preferred mesogenic radicals of the formulae III1, III2 and III3 is shown below. For reasons of simplicity, Cyc here is a 1,4-cyclohexylene group, Dio is a dioxane-2,5-diyl group, Cy is a 1,4-cyclohexylene group in which, in addition, one or two non-adjacent $CH_2$ groups may be replaced by —O—, Phe is a 1,4-phenylene group in which, in addition, one or more CH groups may be replaced by N. PheX is a 1,4-phenylene group which is monosubstituted or disubstituted by F, Cl and/or $CH_3$, Bi is a 1,4-bicyclo[2.2.2]octylene group, Pip is a piperidine-1,4-diyl group, and Nap is a deca-, tetrahydronaphthalene-2,6-diyl or naphthalene-2,6-diyl group.

Particularly preferred mesogenic radicals of the sub-formula III1 are those of the sub-formulae III1-1 to III1-8:

| | |
|---|---|
| $R_1$—Cyc—$Z_2$—Cyc— | III1-1 |
| $R_1$—Phe—$Z_2$—Phe— | III1-2 |
| $R_1$—Phe—$Z_2$—PheX— | III1-3 |
| $R_1$—Phe—$Z_2$—Cyc— | III1-4 |

R₁—Cyc—Z₂—Phe— III1-5
R₁—Phe—Z₂—PheX— III1-6
R₁—Cyc—Z₂—PheX— III1-7
R₁—PheX—Z₂—Phe— III1-8

In the compounds of the sub-formulae III1-1 to III1-8, R is very particularly preferably an alkyl or alkenyl group, furthermore alkoxy or alkanoyloxy in each case having 1-13 carbon atoms. Z² in these compounds is furthermore very particularly preferably an ester group C(—CO—O— or —O—CO—), —CH₂CH₂— or a single bond.

Particularly preferred mesogenic radicals of the sub-formula III2 are those of the sub-formulae III2-1 to III2-16:

R¹—Phe—Z¹—Phe—Z²—Phe— III2-1
R₁—PheX—Z¹—Phe—Z²—Phe— III2-2
R₁—Phe—Z¹—Phe—Z²—PheX— III2-3
R¹—Cyc—Z¹—Cyc—Z²—Cyc— III2-4
R¹—Cyc—Z¹—Phe—Z²—Phe— III2-5
R¹—Cyc—Z¹—Cyc—Z²—Phe— III2-6
R₁—Cyc—Z¹—Cyc—Z²—DiO— III2-7
R₁—Cyc—Z¹—Phe—Z²—PheX— III2-8
R¹—Cyc—Z¹—Cyc—Z²—PheX— III2-9
R¹—Bi—Z¹—Cyc—Z²—Cyc III2-10
R₁—Nap—Z¹—Cyc—Z²—Phe— III2-11
R₁—Cyc—Z¹—Phe—Z²—Phe— III2-12
R¹—Dio—Z¹—Cyc—Z²—Cyc— III2-13
R¹—Phe—Z¹—Cyc—Z²—Cyc— III2-14
R¹—Cyc—Z¹—Phe—Z²—Cyc— III2-15
R¹—Cyc—Z¹—PheX—Z²—Cyc— III2-16

Of the compounds of the sub-formulae III2-1 to III2-16 which contain a 1,4-phenylene group, in which one or two CH₂ groups have been replaced by N, those containing a pyridine-2,5-diyl group or pyrimidine-2,5-diyl group are very particularly preferred.

Particularly preferred mesogenic radicals of the sub-formula III3 are those of the sub-formulae III3-1 to III3-19:

R¹—Phe—Z¹—Phe—Z¹—Phe—Z²—Phe— III3-1
R¹—Cyc—Z¹—Cyc—Z¹—Cyc—Z²—Cyc— III3-2
R¹—Cyc—Z¹—Phe—Z¹—Phe—Z²—Phe— III3-3
R¹—Cyc—Z¹—Cyc—Z¹—Phe—Z²—Phe— III3-4
R¹—Cyc—Z¹—Cyc—Z¹—Cyc—Z²Phe— III3-5
R¹—Cyc—Z¹—Phe—Z¹—Phe—Z²—Cyc III3-6
R¹—Cyc—Z¹—Cyc—Z¹—Phe—Z²—Cyc III3-7
R¹—Cyc—Z¹—Phe—Z¹—Cyc—Z²—Cyc— III3-8
R¹—Phe—Z¹—Cyc—Z¹—Cyc—Z²—Cyc— III3-9
R¹—Phe—Z¹—Phe—Z¹—Cyc—Z²—Cyc— III3-10
R¹—Phe—Z¹—Phe—Z¹—Phe—Z²—PheX— III3-11
R¹—Cyc—Z¹—Cyc—Z¹—PheX—Z²—Phe— III3-12
R¹—Cyc—Z¹—Cyc—Z¹—Phe—Z²—PheX— III3-13
R¹—Cyc—Z¹—PheX—Z¹—Phe—Z²—Cyc— III3-14
R¹—Cyc—Z¹—Phe—Z¹—PheX—Z²—Cyc— III3-15
R¹—PheX—Z¹—Phe—Z¹—Cyc—Z²—Cyc— III3-16
R¹—Dio—Z¹—Cyc—Z¹—Cyc—Z²—Cyc— III3-17
R¹—Cyc—Z¹—Cyc—Z¹—Cyc—Z²—Phe— III3-18
R¹—Cyc—Z¹—Pip—Z¹—Phe—Z²—Phe— III3-19

In the compounds of the sub-formulae III3-1 to III3-19, at least one of the two Z¹ groups or Z² is very particularly preferably a single bond.

Preference is furthermore given to disk-like mesogenic groups and in particular diskotic groups as the radical B. These groups sometimes align themselves parallel to one another spontaneously, i.e., without the action of an external field or mechanical stress, above $T_G$ if the spacers are sufficiently flexible.

Mention may be made by way of example of a series of diskotic liquid-crystalline compounds, this list merely being intended to illustrate the invention without representing a limitation:

(1) hexa-substituted benzene

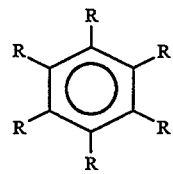

(2) 2,3,6,7,10,11-hexasubstituted triphenyls

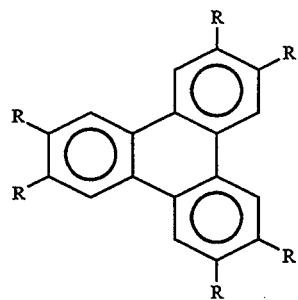

(3) 2,3,7,8,12,13-hexasubstituted truxenes or oxidized homologs thereof

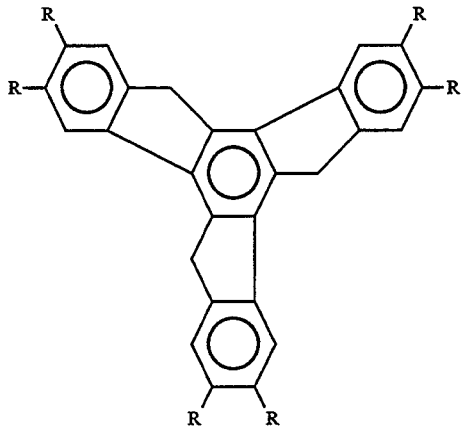

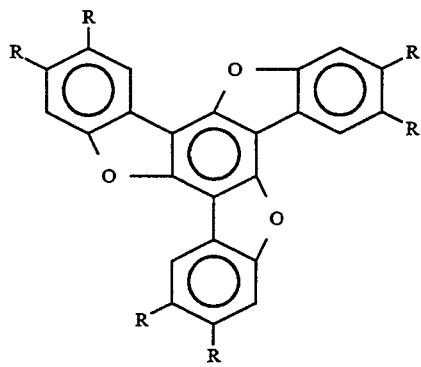

(4) 1,2,3,5,6,7-hexasubstituted anthraquinones

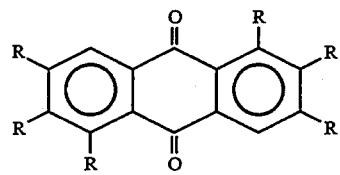

(5) substituted Cu complexes

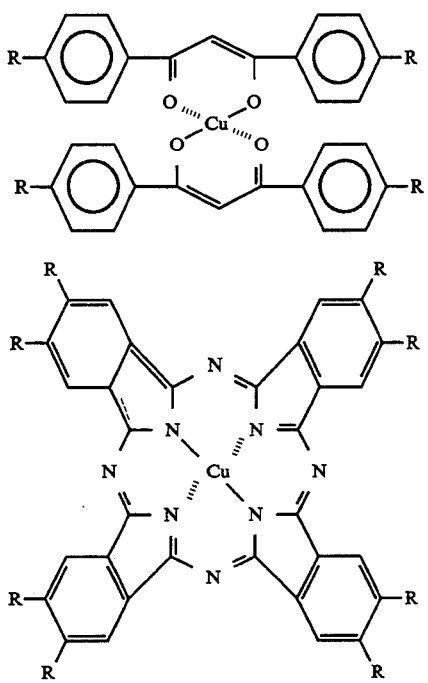

(6) tetraarylbipyranylidium

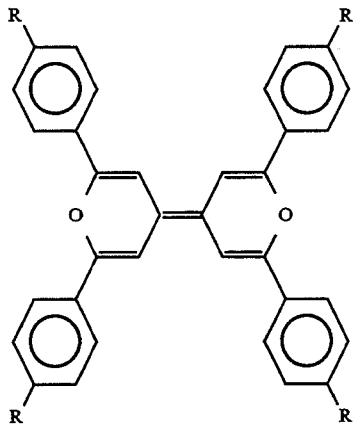

(7) porphyrin derivatives

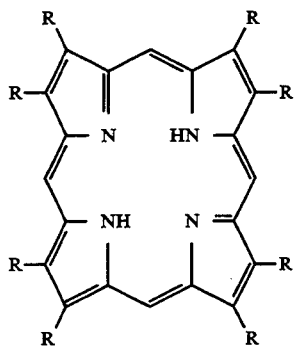

Examples which may be mentioned of crosslinking agents V* are sulfur, hexamethylenetetramine, paraformaldehyde, divinylbenzene, fatty acid amides, oligoalkenes, oligosulfides and oligoisocyanates.

The reactive radicals R* contain at least 2 functional groups, the reactivity of at least one group generally differing from that of the other groups under the selected reaction conditions. Thus, for example, it is possible for at least one of the reactive groups of R* to be a vinyl group, acryloyl group, or another group which can be polymerized by means of free radicals, while a group which is not reacted under the conditions of the free-radical polymerization is a hydroxyl, carboxyl or amino group. However, it is also possible, for example, for the molecules R* to contain groups which are reacted by the same reaction mechanism, but with selective catalysis or with significantly different reactivity (cf. Example 1). The reactive groups may be arranged, for example, terminally on the molecules R* and are then usually linked via a linear or branched carbon chain having 1-20 carbon atoms in which, in addition, up to 8 non-adjacent $CH_2$ groups may be replaced by —O—, —CO—, —COO—, OCO—, —S—, —HC=CH—, —C≡C—, —CHhalogen-, —C(halogen)$_2$—, —NH—, —($C_{1-5}$-alkyl)—N—, an alicyclic or aromatic ring. However, it is also possible for the reactive groups to be in a non-terminal position.

However, V* and R* may also be identical; in this case, the crosslinking reaction is terminated, for example, by reducing the temperature or by varying other suitable parameters so that only some of the crosslinking molecules have fully reacted, while the remainder has either only reacted partially or not at all and accordingly contains at least one reactive functional group. It is not absolutely necessary here for the reactive groups of V* or R* to have different reactivities. The mechanical stretching is then carried out at the reduced temperature or with another parameter set suitably, and chemically fixed by increasing the temperature or by varying the other parameter(s).

The abovementioned examples of P, Sp, B, R or R* and V or V* should only be taken to be illustrative and are intended to illustrate the invention without representing a limitation.

The thermoset materials or elastomers according to the invention can also be prepared using further elastomers in addition to the preferred elastomers of the formula I. Thus, for example, copolymers containing mesogenic side groups and non-mesogenic side groups are sometimes preferred in order, for example, to reduce an excessively high value for the birefringence or to vary other specific material properties.

Elastomers which contain side groups having non-linear optical properties are suitable as materials for non-linear optics.

It is furthermore possible to use elastomers which contain mesogenic groups both in the polymer backbone and in the side groups. Elastomers of this type can be stretched to give optically polyaxial monocrystals.

The preferred elastomers of the formula I described in detail and the other elastomers indicated should only be understood as illustrative and are merely intended to illustrate the invention without representing a limitation. The invention can be applied very generally to elastomers containing reactive radicals having at least one unreacted functional group and is not restricted to specific elastomers.

Figure 5:
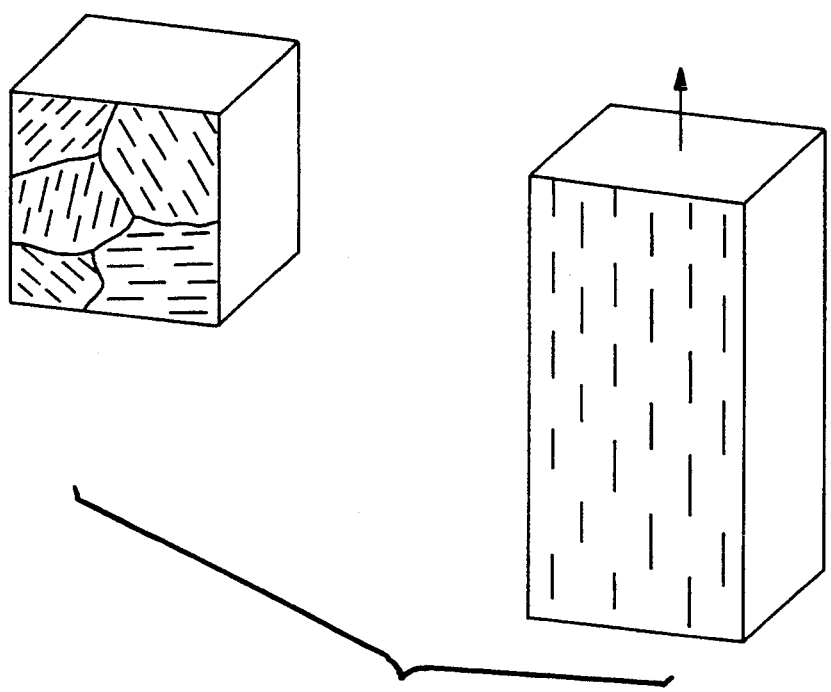
FIG. 5 illustrates an elastomer which is non-uniformly aligned on a macroscopic level in an unloaded state and conversion the elastomer into a highly ordered state by application of tensile stress.

The elastomers are stretched by applying a mechanical "field" and thus aligned. FIG. 5 (taken from: M. Ballauff, Chemie in unserer Zeit, 22, (1988) 63) shows schematically that an elastomer which has been nonuniformly aligned on a macroscopic level in the unloaded state (polydomain structure) and thus appears opaque is converted, by application of tensile stress, into a highly ordered state which, with respect to its optical properties, is similar to an organic monocrystal of the same dimensions. The behavior exhibited is observed, for example, in an elastomer having a uniaxial nematic phase where the nematic directors of the mesogenic groups align parallel to the axis of elongation.

Other alignments of the nematic directors can be achieved, for example, if the elastomer is biaxially stretched, i.e., if the mechanical stress acts simultaneously along 2 different deformation axes, which are preferably at right angles to one another. Complicated deformation patterns are possible, but are generally not preferred.

The mechanical stress, which is transferred to the sample by means of suitable devices, such as, for example, tensioning clamps, or by application to a base film, can cause elongation, compression or alternatively shearing of the sample; whereas pure torsion or flexural stresses frequently do not result in a desired alignment of the nematic directors, these stresses can preferably be combined with elongations or compression. The stress to be used depends on the size and geometry of the sample and in particular also on its elasticity or the crosslinking density, and the temperature, and is typically between $10^{-3}$ and $10^{-6}$ N/m², and in particular between $10^{-4}$ and $10^{-5}$ N/m².

In order to produce a bipolar alignment, an electric field can be applied in addition to the mechanical stress. The field strength here depends, for example, on the dielectric anisotropy of the mesogenic groups and is typically 1–50 kV/100 μm. The additional application of an electric field is preferred.

After the nematic directors of the mesogenic groups have been aligned in the desired manner in the first step, this alignment is chemically fixed in a subsequent 2nd step by additionally crosslinking the elastomer in the deformed state by reacting the free functional groups of the reactive radicals R with adjacent polymer chains.

Depending on the nature of the free functional group, a large number of possible reactions are suitable for this second crosslinking reaction. If the free functional groups are, for example, hydroxyl groups, it is possible to link, for example, free hydroxyl groups of reactive radicals of adjacent polymer chains or alternatively free hydroxyl groups of reactive radicals with hydroxyl groups of polymer chain units, for example by means of diisocyanates. It is of course also possible, for example, to esterify the free hydroxyl group by means of carboxyl groups or acid chloride groups of adjacent reactive radicals or polymer chains or alternatively to react them with further functional groups. In addition to the hydroxyl group, suitable free reactive groups are also, in particular, amino groups, mercapto groups, carboxyl groups or functional groups derived from carboxyl groups, sulfonic acid groups or functional groups derived from this group, epoxy groups and further functional groups. This list is merely intended to illustrate the invention and is in no way intended to be a limitation; a person skilled in the art can easily indicate further reactive groups and possible reactions without requiring an inventive step.

The additional crosslinking reaction is carried out under suitable conditions. Thus, the reaction of free functional groups can be carried out, for example, by increasing the temperature or by UV irradiation, if necessary with addition of a catalyst. The reaction conditions here are preferably selected so that the degree of reaction of the reactive groups can be modified and established in a specific manner. A high concentration of reactive radicals and/or more or less complete reaction of the free functional groups results in a liquid-crystalline thermoset monocrystal, whereas a low or moderate concentration of the reactive radicals and/or incomplete crosslinking gives a liquid-crystalline elastomer monocrystal. The overall crosslinking density is typically between 2 and 20% for elastomers and generally greater than 50% for thermoset materials; however, these values can only be regarded as a rough guide, and relatively large differences are also possible since they depend on the molecular weight of the starting polymers and/or oligomers.

The process according to the invention allows the provision of liquid-crystalline elastomer or thermoset monocrystals which are distinguished by a high degree of ordering. In contrast to conventional liquid-crystalline monodomains, the elastomers or thermoset materials according to the invention having a fixed anisotropic network structure can be prepared in virtually any geometry or size; thus, for example, films, sheeting, cube-like elements, cylinders or other shapes can be obtained. The properties of the liquid-crystalline elastomer or thermoset monocrystals according to the invention can be varied within broad ranges and can be optimized with respect to the particular application. Thus, the elasticity can be adjusted via the overall degree of crosslinking, or components having dichroic or non-linear optical properties can be obtained if the -Sp-B group is formed as a chromophor or NLO chromophor respectively.

The liquid-crystalline elastomer or thermoset monocrystals according to the invention can be employed for a very wide variety of applications. Films and sheeting can be employed, in particular, as planar waveguides. Local director realignments or local changes in the refractive indices enable the production of integrated optical components, as described in WO 89/09149; in contrast to WO 89/09149, the optical structures are retained permanently when the process according to the invention is used. Furthermore, the liquid-crystalline elastomer or thermoset monocrystals according to the invention can be used to produce frequency doublers, Pockels cells, Kerr cells and dichroic filters of high quality, and further optical components.

The liquid-crystalline elastomer or thermoset monocrystals according to the invention do not have the disadvantages which occur in conventional liquid-crystalline monodomains or only do so to a lesser extent and, like the process according to the invention, therefore have considerable economic importance.

The examples below are intended to illustrate the invention without representing a limitation.

EXAMPLES

Example 1 a) Preparation of the liquid-crystalline polymer

The following components

| | | %, based on Si-H |
|---|---|---|
| Polymethylhydrogensiloxane | 180 mg (3 mmol) | 100% |

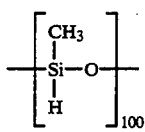

| | | |
|---|---|---|
| Mesogen M4OCH | 672 mg (2.25 mmol) | 75% |

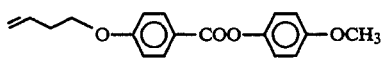

| | | |
|---|---|---|
| Mesogen M4CN | 45 mg (0.15 mmol) | 5% |

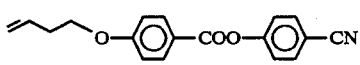

| | | |
|---|---|---|
| Crosslinking agent V1 (≙V*) | 49.5 mg (0.12 mmol) | 8% |

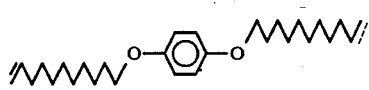

| | | |
|---|---|---|
| Crosslinking agent V2(≙·R*) | 86.4 mg (0.18 mmol) | 12% |

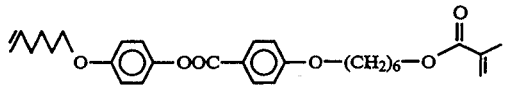

| | |
|---|---|
| Catalyst | 9 μl |

SLM 86005 (Wacker)
are dissolved in 3 ml of water- and thiophene-free toluene. The polymer-analogous reaction is carried out by the spin casting process. To this end, the above solution is filtered through a 0.5 μm filter (Millipore Corp.) and injected directly into a dust-free centrifuge tube. The inner wall of the tube is lined with a Teflon film. The centrifuge tube is sealed and inserted into the centrifuge. The reaction solution is then centrifuged at 60° C. for 70 minutes.

Figure 1:
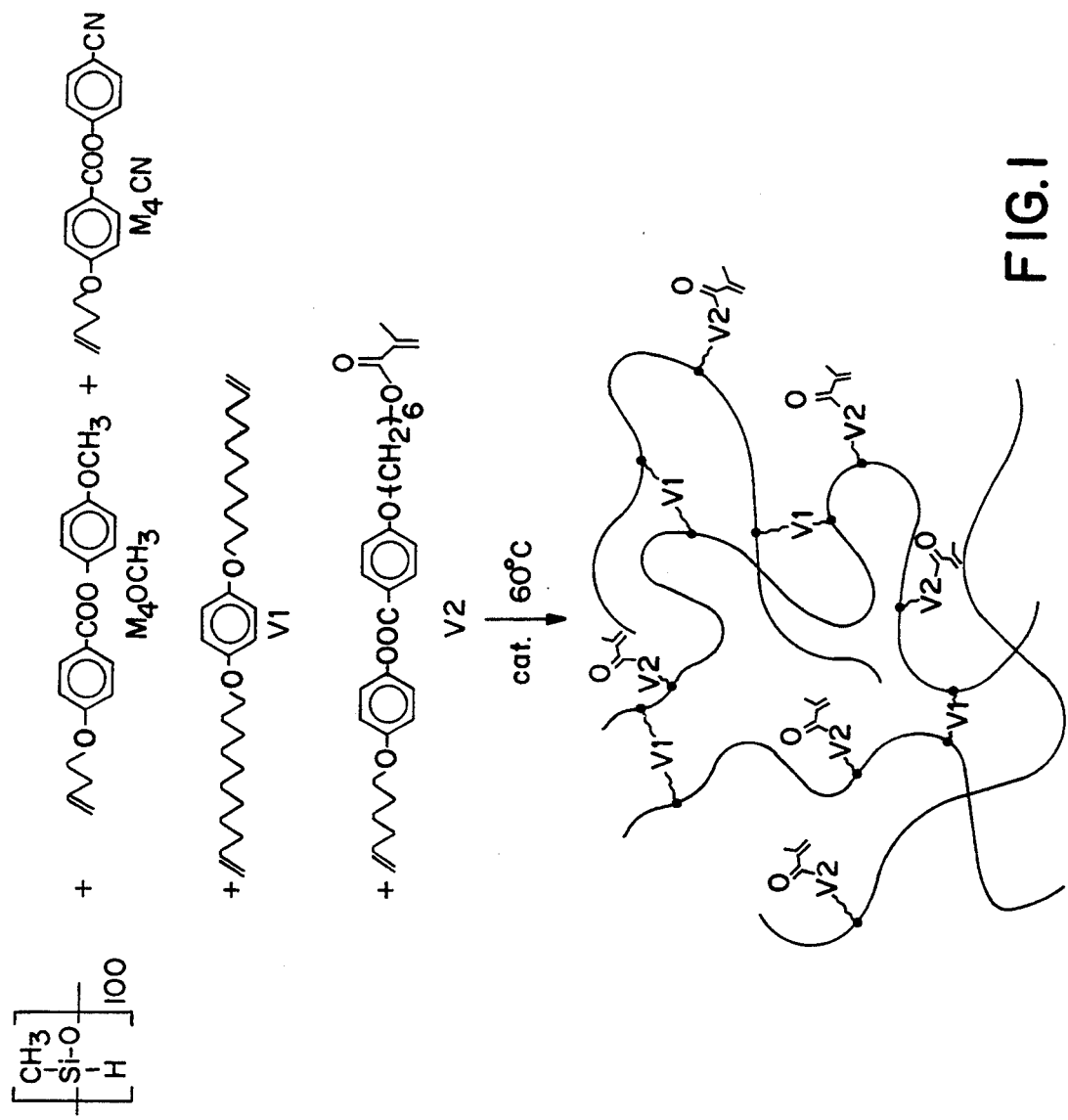
FIG. 1 illustrates preparation of a liquid-crystalline elastomer containing free functional groups.

The preparation of the liquid-crystalline elastomer containing free functional groups by the addition reaction of the vinyl groups with the Si-H group of the polymethylhydrogensiloxane is shown schematicaly in FIG. 1.

The centrifuge tube is subsequently cooled in a refrigerator to a temperature of 0° C. The lid is removed, and the Teflon film is withdrawn together with the swollen elastomer adhering to it.

b) Alignment of the elastomer

A piece of adhesive tape is stuck as quickly as possible to one end of the elastomer adhering to the Teflon film, and the elastomer is then slowly detached from the Teflon film and carefully suspended. The elastomer has the following dimensions:
Thickness: 338 μm
Length: 120 mm
Width: 15 mm The initially swollen, transparent elastomer shrinks and slowly becomes cloudy. As soon as the cloudiness becomes clearly visible, a weight is attached to the free end of the suspended elastomer. The weight is increased very carefully until the cloudy elastomer becomes fully transparent again.

c) Fixing of the alignment

After about 30 minutes, the suspended, weighted elastomer is introduced into a drying cabinet and conditioned at about 30° C. for 10 hours. The temperature is then increased to about 50°-70° C., and the elastomer is conditioned for a further 72 hours.

Figure 2:
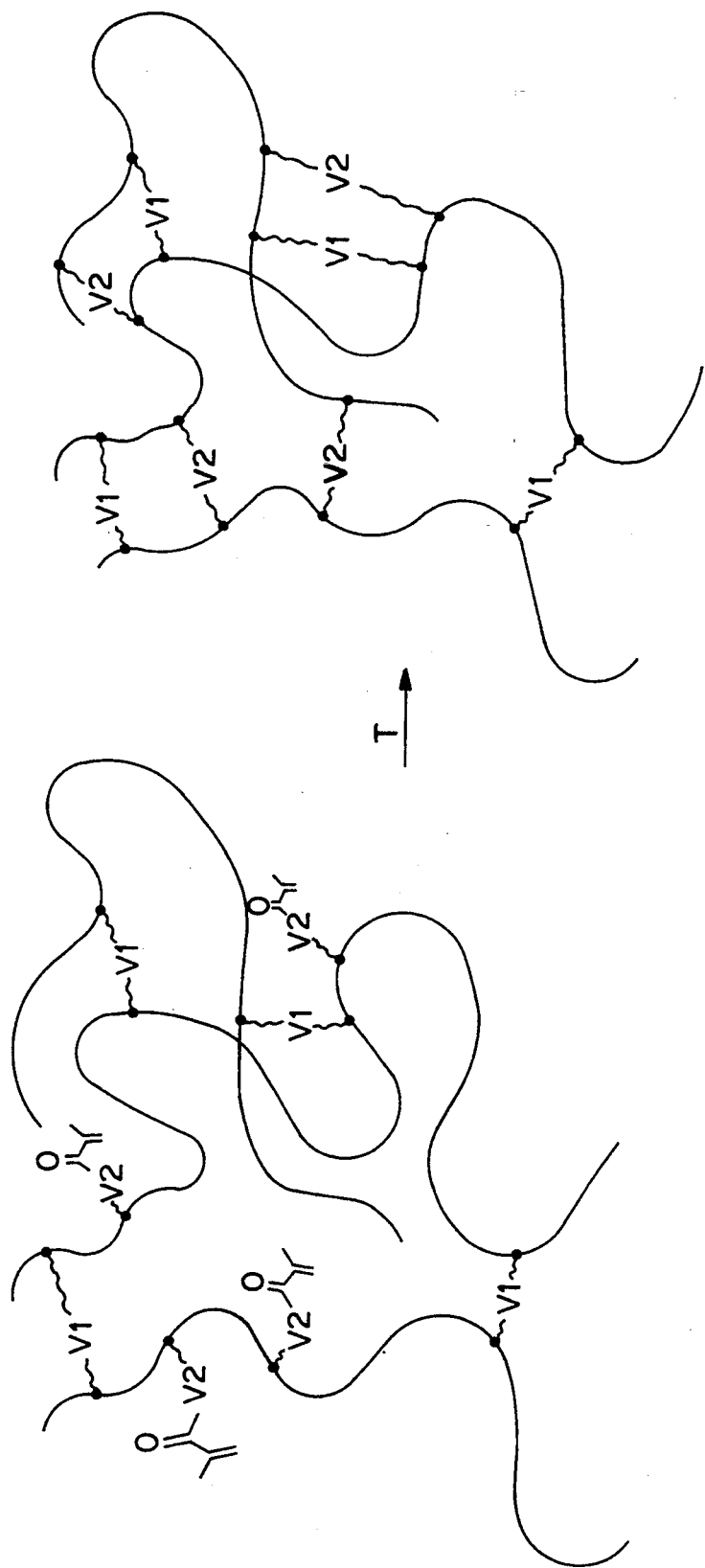
FIG. 2 illustrates fixing of an anisotropic network structure.

The fixing of the anisotropic network structure by reaction of the still-free methacrylic acid double bonds with the Si-H group is shown schematically in FIG. 2.

The second crosslinking reaction (=reaction of the reactive radicals) is subsequently terminated, and the resultant liquid-crystalline elastomer having a fixed anisotropic network structure is fully dried in vacuo.

d) Properties of the liquid-crystalline elastomer monocrystal

The degree of ordering determined by measuring the IR dichroism ($S = \epsilon_{||} - \epsilon_{\perp}/\epsilon_{||} + 2\epsilon_{\perp}$) is $S = 0.72$, and the birefringence is $\Delta n = 0.15$ ($\lambda = 633$ nm, $T = 25°$ C.).

The elastomer monocrystal exhibits highly anisotropic swelling behavior on swelling in toluene:
$\alpha_{length} = 1.10$
$\alpha_{width} = 2.05$
$\alpha_{thickness} = 2.07$
where α indicates the relative change based on the unswollen state.

Figure 3A:
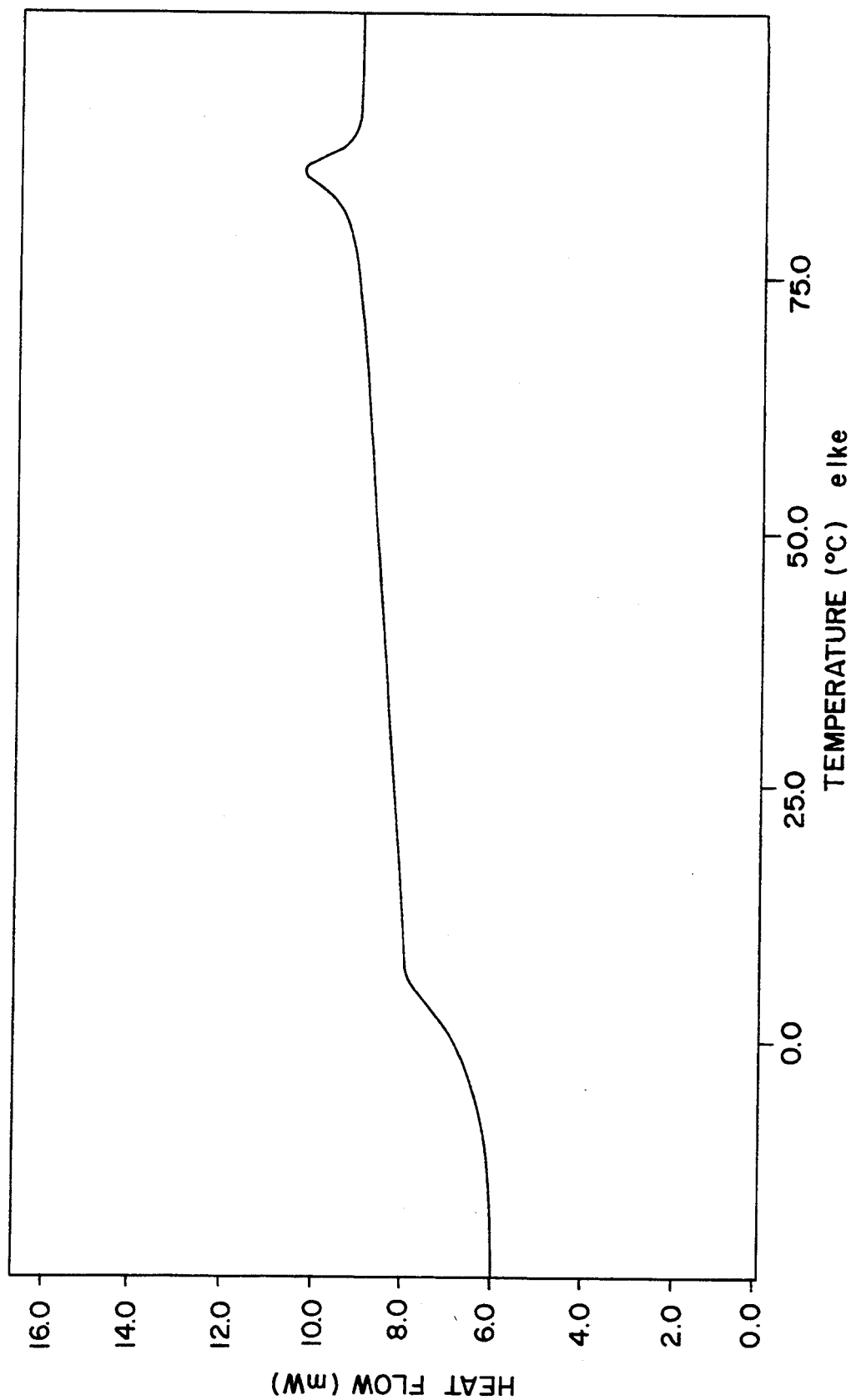

The DSC diagrams for the unaligned elastomer from Example 1a and the aligned elastomer monocrystal from Example 1c are shown in FIG. 3a and 3b respectively. The heating rate in both cases was 9° C./min; the sample amount of the unordered elastomer was 25.62 mg and that of the elastomer monocrystal was 24.91 mg. It can be seen from these figures that the clearing point of the ordered elastomer is increased by about 1° C. compared with that of the unordered elastomer; this increase in clearing point corresponds to theoretical expectations (cf. J. Schätzle et al. Makrom. Chem., 190 (1989) 3269).

Figure 4A:
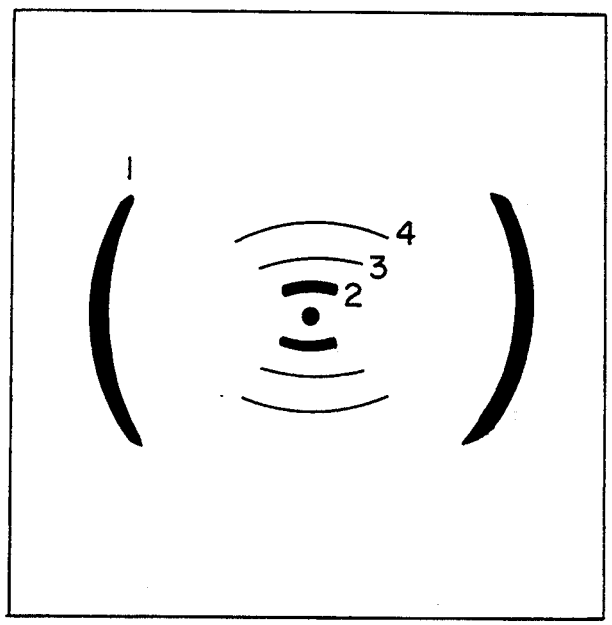
FIG. 4a illustrates an X-ray diffraction pattern for a film produced in accordance with Examples 1a–c.
Figure 4B:
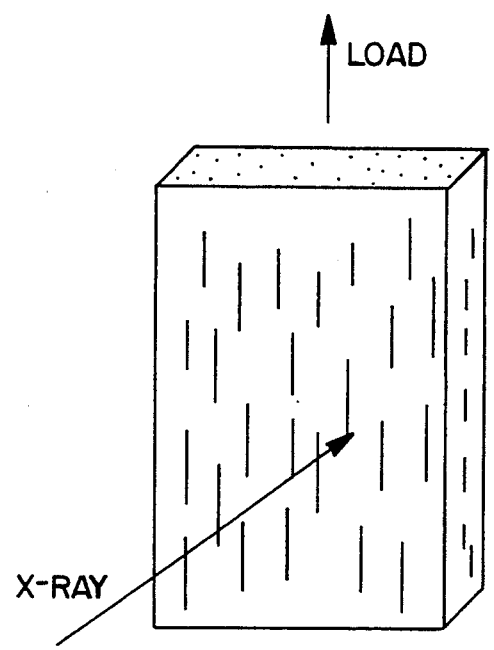
FIG. 4b illustrates impingement of X-rays on a sample perpendicular to the tensile stress direction.

FIG. 4a shows an X-ray diffraction pattern for a film (thickness = 338 μm) produced as described in Example 1a-c and it can be seen from FIG. 4b that the X-rays impinged on the sample perpendicular to the tensile-stress direction selected during the alignment; the Cu$K\alpha$ line was used. The following assignment applies in FIG. 4a:
1. 4.2 Å
2. 22.3 Å
3. 11.1 Å
4. 7.2 Å

It can be concluded from the measured values for n, S and the X-ray diffraction pattern that the mesogenic groups in the liquid-crystalline monocrystal elastomer are aligned parallel to the direction of tensile stress selected during the alignment.

Example 2 a) Preparation of the liquid-crystalline polymer

The following components

| | | %, based on Si-H |
|---|---|---|
| Polymethylhydrogensiloxane | 60 mg (1 mmol) | 100% |

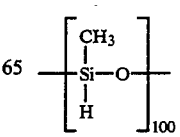

-continued

Mesogen M₄OCH₃      45 mg (0.15 mmol)    15%

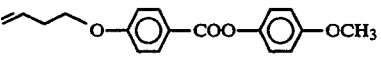

Mesogen M₄CN      15 mg (0.05 mmol)    5%

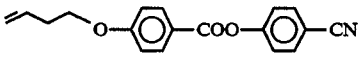

Crosslinking agent V1 (≙V*)      16.6 mg (0.04 mmol)    8%

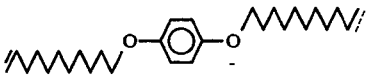

Crosslinking agent V2 (≙R*)      173.3 mg (0.36 mmol)    72%

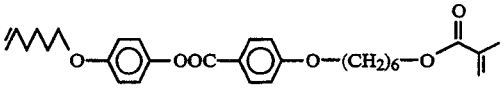

Catalyst      3 μl

SLM 86005 (Wacker)

are dissolved in 1 ml of water- and thiophene-free toluene. The polymer-analogous reaction is carried out by the spin casting process. To this end, the above solution is filtered through a 0.5 μm filter (Millipore Corp.) and injected directly into a dust-free centrifuge tube. The inner wall of the tube is lined with a Teflon film. The centrifuge tube is sealed and inserted into the centrifuge. The reaction solution is then centrifuged at 60° C. for 70 minutes.

The centrifuge tube is subsequently cooled in a refrigerator to a temperature of 0° C. The lid is removed, and the Teflon film is withdrawn together with the swollen elastomer adhering to it.

b) Alignment of the elastomer

A piece of adhesive tape is stuck as quickly as possible to one end of the elastomer adhering to the Teflon film, and the elastomer is then slowly detached from the Teflon film and carefully suspended.

The initially swollen, transparent elastomer shrinks and slowly becomes cloudy. As soon as the cloudiness becomes clearly visible, a weight is attached to the free end of the suspended elastomer. The weight is increased very carefully until the cloudy elastomer becomes fully transparent again.

c) Fixing of the alignment

After about 30 minutes, the suspended, weighted elastomer is introduced into a drying cabinet and conditioned at about 30° C. for 10 hours. The temperature is then increased in steps to about 150° C. and the elastomer is conditioned for a further 24 hours.

The second crosslinking reaction (=reaction of the reactive radicals) is then complete, and the resultant transparent thermoset material having a fixed anisotropic network structure is fully dried in vacuo.

d) Properties of the liquid-crystalline thermoset monocrystal

The thermoset material is hard and brittle and breaks in a glass-like manner when loaded.

Figure 6:
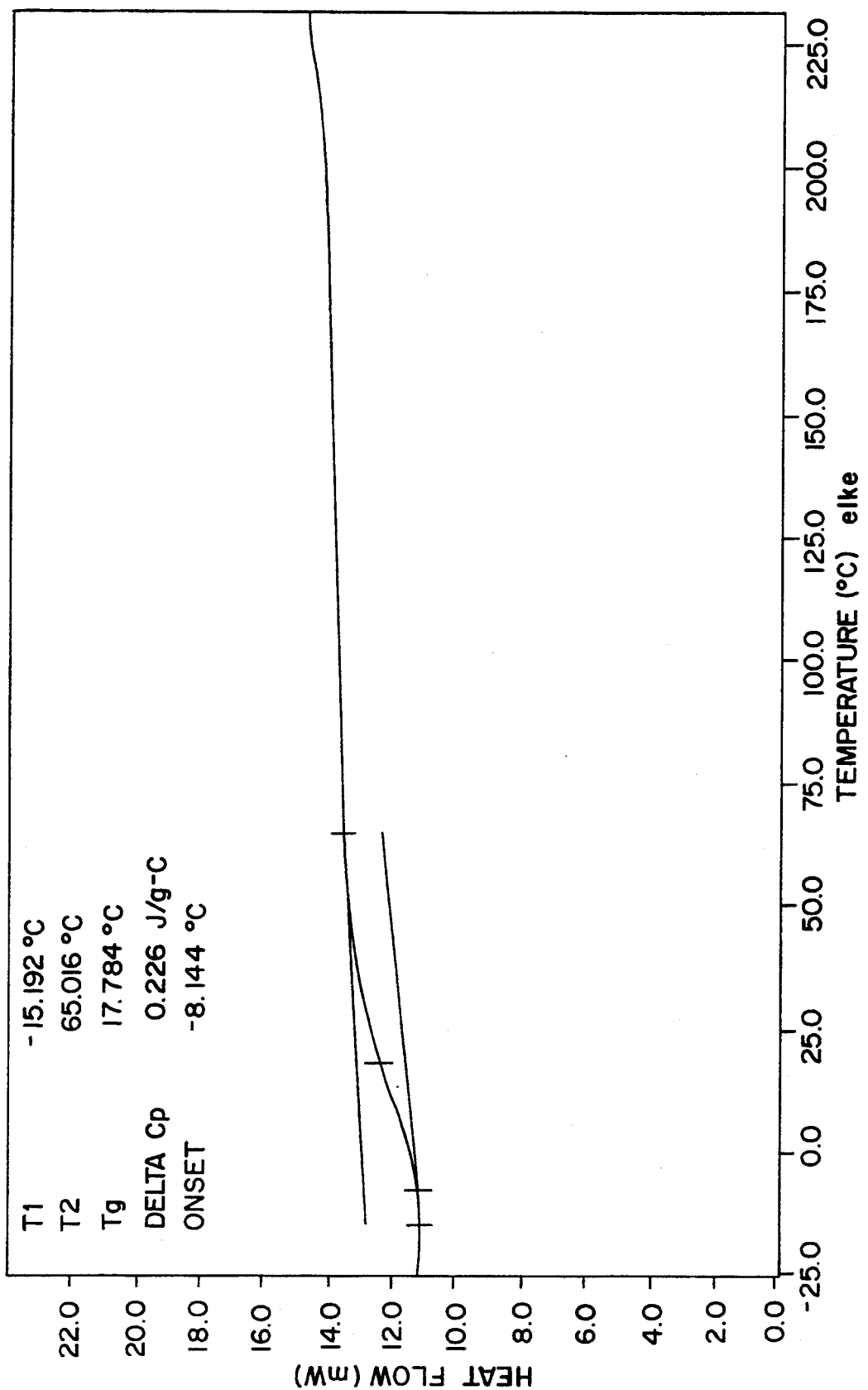
FIG. 6 illustrates a DSC diagram for an ordered thermoset material.

FIG. 6 shows the DSC diagram for the ordered thermoset material. No liquid-crystalline-isotropic phase transition can be seen, and no isotropic phase can be detected under a polarizing microscope before the thermoset material decomposes.

The thermoset material obtained is thus liquid-crystalline and stable up to high temperatures.

We claim:

1. A process for the preparation of liquid-crystalline elastomers or thermoset materials having a fixed, anisotropic network structure, comprising:
   aligning liquid crystalline elastomer containing reactive radicals having unreacted functional groups by subjecting said elastomer to mechanical stress, and subsequently fixing the alignment by linking at least a portion of said reactive radicals to polymer chains.

2. A process according to claim 1, wherein said liquid-crystalline elastomer containing reactive radicals is selected from the elastomers of formula I

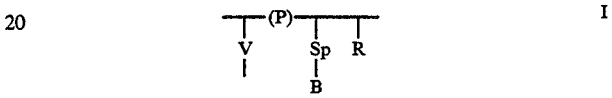

wherein
P is a polymer main chain,
Sp is a bivalent spacer group,
B is an organic rod-like mesogenic radical containing at least two six-membered groups, a disk-like mesogenic radical or a board-like mesogenic radical,
V is a group which crosslinks polymer chains, and
R is a reactive radical capable of linking to a polymer chain.

3. A process according to claim 1, wherein during alignment of said elastomers by mechanical stress, said elastomer is also subjected to an electric field to produce a bipolar alignment.

4. A liquid-crystalline elastomer or thermoset material having a fixed, anisotropic network structure, obtained by a process according to claim 1.

5. In an optical component containing a liquid-crystalline elastomer or thermoset material, the improvement wherein said elastomer or thermoset material is one of claim 4.

6. A liquid-crystalline elastomer or thermoset material having a fixed, anisotropic network structure, obtained by a process according to claim 2.

7. A liquid-crystalline elastomer or thermoset material having a fixed, anisotropic network structure, obtained by a process according to claim 3.

8. In an optical component containing a liquid-crystalline elastomer or thermoset material, the improvement wherein said elastomer or thermoset material is one of claim 6.

9. In an optical component containing a liquid-crystalline elastomer or thermoset material, the improvement wherein said elastomer or thermoset material is one of claim 7.

10. A process according to claim 2, wherein reactive radical R exhibits a reactive site which does not react under the conditions at which the crosslinking agents forming crosslinking groups —V— react.

11. A process according to claim 2, wherein the polymer forming said polymer main chain is a polyacrylate, polymethacrylate, poly-α-haloacrylate, poly-α-cyanoacrylate, polyacrylamide, polyacrylonitrile, polymethylene malonate, polyether, polyester, polyamide, polyimide, polyphosphazene, polyurethane or polysiloxane.

12. A process according to claim 2, wherein said bivalent spacer group Sp is a linear or branched alkylene group having 1-20 C atoms in which one or more non-adjacent $CH_2$ groups can be replaced by —O—, —S—, —CO—, —O—CO—, —S—CO—, —O—COO—, —CO—S—, —CO—O—, —CH(halogen)—, —CHCN—, —CH=CH— or —C≡C—.

13. A process according to claim 12, wherein said bivalent spacer group Sp is ethylene, propylene, butylene, pentylene, hexylene, octylene, decylene, undecylene, dodecylene, octadecylene, ethyleneoxyethylene, methyleneoxybutylene, ethylenethioethylene, ethylene-N-methyliminoethylene or 1-methylalkylene.

14. A process according to claim 2, wherein B is a group of formula III $$R^1—(A^1—Z^1)_n—A^2—Z^2—A^3—  \quad III$$

wherein
$R^1$ is F, CN or alkyl having 1-15 C atoms which is unsubstituted or substituted by at least one halogen atom and in which one or more non-adjacent $CH_2$ groups may be replaced by —O—, —S—, —CO—, —O—CO—, —CO—O—, —O—CO—O—, —S—CO—, —CO—S— and/or —CH=CH—;
$Z^1$ and $Z^2$ are each, independently of one another, —CO—O—, —O—CO—, —CH$_2$CH$_2$—, —CH$_2$—O—, —OCH$_2$—, —C≡C— or a single bond;
$A^1$, $A^2$ and $A^3$ are each, independently of one another, a 1,4-phenylene in which one or more CH groups may be replaced by N, 1,4-cyclohexylene in which one or two non-adjacent $CH_2$ groups may be replaced by O and/or S, 1,4-cyclohexenylene, 1,4-bicyclo(2,2,2)octylene, piperidine-1,4-diyl, decahydronaphthalene-2,6-diyl, or 1,2,3,4-tetrahydronaphthalene-2,6-diyl, in each case being unsubstituted or monosubstituted or polysubstituted by halogen, nitrile and/or $C_1$-$C_4$-alkyl; and
n is 0, 1, 2 or 3.

15. A process according to claim 2, wherein
the polymer forming said polymer main chain is a polyacrylate, polymethacrylate, poly-α-haloacrylate, poly-α-cyanoacrylate, polyacrylamide, polyacrylonitrile, polymethylene malonate, polyether, polyester, polyamide, polyimide, polyphosphazene, polyurethane or polysiloxane;
said bivalent spacer group Sp is a linear or branched alkylene group having 1-20 C atoms in which one or more nonadjacent $CH_2$ groups can be replaced by —O—, —S—, —CO—, —O—CO—, —S—CO—, —O—COO—, —CO—S—, —CO—O—, —CH(halogen)—, —CHCN—, —CH=CH— or —C≡C—; and
B is a group of formula III $$R^1—(A^1—Z^1)_n—A^2—Z^2—A^3—  \quad III$$

wherein
$R^1$ is F, CN or alkyl having 1-15 C atoms which is unsubstituted or substituted by at least one halogen atom and in which one or more non-adjacent $CH_2$ groups may be replaced by —O—, —S—, —CO—, —O—CO—, —CO—O—, —O—CO—O—, —S—CO—, —CO—S— and/or —CH=CH—;
$Z^1$ and $Z^2$ are each, independently of one another, —CO—O—, —O—CO—, —CH$_2$CH$_2$—, —CH$_2$—O—, —OCH$_2$—, —C≡C— or a single bond;
$A^1$, $A^2$ and $A^3$ are each, independently of one another, a 1,4-phenylene in which one or more CH groups may be replaced by N, 1,4-cyclohexylene in which one or two non-adjacent $CH_2$ groups may be replaced by O and/or S, 1,4-cyclohexenylene, 1,4-bicyclo(2,2,2)octylene, piperidine-1,4-diyl, decahydronaphthalene-2,6-diyl, or 1,2,3,4-tetrahydronaphthalene-2,6-diyl, in each case being unsubstituted or monosubstituted or polysubstituted by halogen, nitrile and/or $C_1$-$C_4$-alkyl; and
n is 0, 1, 2 or 3.

16. A process according to claim 1, wherein the mechanical stress applied to said elastomer is $10^{-3}$–$10^{-6}$ $N/m^2$.

17. A process according to claim 3, wherein the field strength of said electric field is 1-50 kV/100 μm.

18. A liquid-crystalline elastomer selected from formula

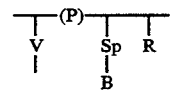

wherein
P is a polymer main chain,
Sp is a bivalent spacer group,
B is an organic rod-like mesogenic radical containing at least two six-membered groups, a disk-like mesogenic radical or a board-like mesogenic radical,
V is a group which crosslinks polymer chains, and
R is a reactive radical capable of linking to a polymer chain;
wherein reactive radical R is different from the crosslinking agents forming crosslinking groups —V—.

19. A process for the preparation of liquid-crystalline elastomers or thermoset materials having a fixed, anisotropic network structure, comprising:
fixing the alignment of a mechanically stressed liquid-crystalline elastomer containing reactive radicals having unreacted functional groups, by linking at least a portion of said reactive radicals to polymer chains.

* * * * *